United States Patent Office 2,742,378
Patented Apr. 17, 1956

2,742,378

FILLERS HAVING VINYL SILOXANE GROUPS BONDED TO THE SURFACE THEREOF AND COPOLYMERS THEREOF WITH ETHYLENICALLY UNSATURATED POLYMERIZABLE MONOMERS

Theodore A. Te Grotenhuis, Olmsted Falls, Ohio, assignor of twenty per cent to The General Tire & Rubber Company, Akron, Ohio, a corporation of Ohio No Drawing. Application August 2, 1952,
Serial No. 302,415

28 Claims. (Cl. 117—76)

This application is a continuation-in-part of my application Serial No. 251,152, filed October 12, 1951, and of my application Serial No. 243,737, filed August 25, 1951, and of my application Serial No. 585,824, filed March 30, 1945, now abandoned, which application was copending with application Serial No. 593,970, filed May 15, 1945, now abandoned, and with application Serial No. 559,848, filed October 31, 1944, now Patent 2,457,097, which is a continuation-in-part of application Serial No. 424,293, filed December 26, 1941, now abandoned.

The present invention relates to composite articles of reinforcing material such as pigments and fibers, preferably a matted or woven fabric, and a high molecular weight polymeric substance. It particularly relates to composite articles and methods of preparing such articles comprising a water insoluble inorganic pigment or textile fabric or fibers and in situ polymerized high polymer molecularly bonded to said fabric by interaction of unsaturated linkages on the fiber or pigment surface and of the monomer entering into the solid polymer. The term "polymer" is herein used in its generic sense to include copolymers of one or more monomers.

Composite articles of pigments such as silica, titania, carbon black, etc. and/or fibers such as cellulosic fibers, glass fibers, and the like, and a high polymer such as a polymer of a material comprising a mono-olefinic compound such as styrene, methyl methacrylate, vinyl halide, etc. as a substantial polymerizing ingredient thereof are well-known. Such composite articles in which the pigments, fabric or fibers act as reinforcing agents which should contribute great strength and impact resistance to the article sometimes have relatively low water resistance or the bond between the water insoluble pigment or fiber and the resin is insufficient to prevent rupture when contacted with certain fluids. The strength of the composite article may also be much less in the dry state than should be the case if proper adhesion of fiber and polymer were obtained. Even thermoset or cross-linked polymers reinforced with fibers and pigments are frequently adversely affected. The result is to limit the utility of the composite article.

It is an object of the present invention to provide reinforced articles of any textile fabric and a high polymeric material formed of a monomer having polymerizable olefinic unsaturation, in which the bond between the fabric and the high polymer may be chemical in nature and therefore much stronger than the usual adhesive forces.

It is another object of the present invention to provide a textile fabric which, when treated with free radical polymerizable mono-olefinic monomers or mixtures comprising such monomers can form interlocking chemical bonds therewith.

It is another object of the present invention to provide a method of treating fine particles such as pigments, fibers, and fabrics so that they are readily compounded with organic substances and so that they can be bonded thereto by chemical means such as by possible interpolymerization or by sulfur or chemical bridges.

It is another object of the present invention to provide a method of treatment for fine particles and fibers by which the particles are rendered more readily wettable and interlocked with polymerizable organic compounds and polymers.

It is still another object of the present invention to provide a simple and inexpensive method of improving the ease of dispersion and compounding of fine particles in organic vehicles and polymers.

It is a further object to provide composite articles and a method of making composite articles comprising a solid polymer of a free radical polymerizable unsaturated material reinforced with textile fabric and having the textile fabric molecularly interlocked with said solid polymer. Other objects will be apparent from the following description of the invention.

In accordance with the present invention, an olefinic siloxane, preferably a vinylsiloxane, is deposited on the surface of the fabric. This is most conveniently accomplished by subjecting the surface of the fabric to contact with a water reactive organosilicon compound containing at least one organic group having aliphatic carbon-to-carbon double bonds, preferably a vinyl group, at least one group split off together with H from contacting —OH to form a new silicon-oxygen bond. The organo silicon compounds generally have the general formula

where X is a group which is split off with hydrogen from contacting hydroxyl groups with formation of a new silicon-oxygen bond. X is preferably chlorine or bromine, although it may be oxyaryl, oxyaliphatic, or amino ($NH_2$ groups). R is an unsaturated group preferably an unsaturated hydrocarbon group. Examples of suitable unsaturated groups are dienyl, and the vinyl groups, vinyl, chlorvinyl, and bivinyl, and Y and Z may be selected from any monovalent organic groups, preferably those hydrocarbons with less than 7 carbon atoms such as phenyl, methyl, etc., and groups split off by contact with hydroxyl groups and oxygen-containing groups. This treatment provides on the surface of the fibers the

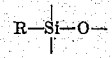

groups where the free silicon valences are attached to oxygen or carbon and the free oxygen valence is generally attached to the surface of the fiber or pigment. Those compounds having a carbon-to-silicon bond are preferred because of their increased stability at elevated temperatures.

Examples of suitable hydroxyl or water-reactive organosilicon compounds having unsaturated groups for interaction with in situ free radical polymerizable monomer containing compositions are the water hydrolyzable alkylenyl silicon halides including the mono-, di-, and tri-vinyl silicon chlorides, bromides, and amines all of which may be seen to have a carbon of a carbon to carbon double bond connected directly to silicon. The haloalkylenyl silicon chlorides and bromides, the dienyl silicon chlorides and bromides such for example as the butadienyl silicon chlorides and bromides all of which have at least one organic group with at least two carbon atoms connected by double bonds. Vinyl and butadienyl groups with less than 6 carbon atoms are preferred because of the usual greater polymerization activity of these groups. If, more than one organic group is attached to silicon, only one need be unsaturated to enter into the copolymerization with the monomer. Thus, the alkylenyl alkyl silicon chlorides such as dimethyl vinyl silicon chlorides, and dimethyl isopropenyl silicon chlorides are suitable. When more than one unsaturated group is present, these unsaturated groups need not be the same. For example, vinyl allyl silicon chlorides and bromides and amines may be used. Similarly, the halogen alkylenyl silicon chlorides and bromides such for example as chlorvinyl dimethyl silicon chlorides and others having a chlorine containing unsaturated group, and attached directly to silicon a group hydrolyzable or reactive with water or hydroxyl particularly adapted to split out halogen present as HCl or the $NH_2$ as ammonia and form a new silicon-oxygen bond are suitable for the fabric treating step in the course of the present invention. Even partially condensed (liquid) vinyl siloxanes (i. e. the hydrolysis products of vinyl chlorsilanes) appear to be water hydrolyzable or reactive to hydroxyl to shift oxygen and form a new silicon-oxygen bond to the surface of the pigment or fiber.

Although the present invention is not concerned with the preparation of the unsaturated water reactive silicon compounds per se, the organosilicon compounds which contain a group which is split off by reaction with water because of extreme desire of silicon to form a new silicon-oxygen bond and which contains an alkylenyl or aliphatic unsaturated group attached to the silicon atom may be prepared in any suitable way as by one or more of the previously proposed following methods.

(A) The Grignard synthesis wherein the desired organohalide as for example R—Br where R is the desired organic radical such for example as vinyl, etc., with silicon tetrachloride or a mono- or diorgano substituted silicon tetrachloride in the presence of magnesium, etc. the conditions for Grignard reactions are well-known in the art.

(B) By cracking at elevated temperatures the corresponding saturated compounds in the presence of a dehydrogenation catalyst to split off hydrogen, for example, ethyl silicon chlorides may be converted to vinyl silicon chlorides by this well-known process.

(C) In some cases they may be prepared by reaction of an unsaturated hydrocarbon such as acetylene, etc. with a silicon tetrachloride or hydride in the presence of a suitable catalyst.

The preparation or properties of organo-substituted silicon halides (organohalo silicones) is well-known and is set forth in one or more of the following United States patents:

Lincoln et al. 2,129,281
Nason 2,182,208
Rochow 2,258,218–19–20–21–22
Rochow 2,286,763
Rochow 2,352,974
Hyde 2,371,050
Rochow 2,371,068

The reinforcing such as the pigment, textile fabric, or other fibrous material used as reinforcing in the composite articles formed in accordance with the present invention is treated by simply contacting the dry fabric with the hydroxyl or water hydrolyzable or condensable silicon compound such as the vinyl silicon chlorides, vinyl silicon amines, vinyl silicon hydroxide, etc. Any method of effecting contact either vapor phase or liquid may be used. The one or more of the reactive silicon compounds (at least those which are relatively non-volatile) are preferably admixed in solution in a non-reactive solvent such for example as a hydrocarbon liquid such as benzene, toluene, or any other diluent that does not react with the silicon halides or amine used. The silicon compound is preferably present in small proportions in the solvent such as .1% to 5% although the reactivity of silicon is such that the extremely dilute solutions are effective. When the silicon compound is liquid, the substantially pure liquid may be used although a dilute solution is more desirable. The reactive silicon compound apparently reacts with hydroxyl or carboxyl groups chemically absorbed or combined with the surface of the fabric to provide unsaturated groups such as vinyl, etc., groups attached over the surface thereof through silicon atoms which are highly compatible with olefinic polymerizable materials and which are capable of chemically combining into the molecules formed by the polymerization of such materials. As before mentioned, the unsaturated groups in the silicon compound may have many carbon atoms, but those having four carbon atoms or less for each unsaturated group and particularly those having less than three carbons per double bond, namely the vinyl and butadienyl silicon halides are preferred. This is especially the case when the reinforcing pigment or fiber is to be used in preparing composite articles by a method wherein a monomeric styrene is subjected to polymerization in contact with the reinforcing fiber or pigment. The olefinic group in such vinyl siloxanes is apparently much more active to interpolymerization than when 3 or more carbons per olefinic group are present. The fibers, fabrics and pigments treated with the solution should be dry and free from water so that reaction with water and hydroxyl not chemically combined or held on the surface of the fibers is avoided. The treated fabric may be neutralized, heated, or washed to eliminate or vaporize traces of acid or ammonia, alcohol, etc. or product split off by reaction or these materials may be volatilized therefrom.

In accordance with the present invention, the fabric which has been treated as above is contacted or immersed in a composition comprising a polymerizable olefinic compound and preferably a polymerizable mono-olefinic compound of less than 6 aliphatic carbon atoms and capable of polymerizing by free radical initiators such as a peroxide and hydroperoxide catalyst, and the polymerizable olefinic compound is subjected to catalyst and caused to polymerize and cause to set to the solid state while in contact with the treated fabric whereby interaction of double bonds on fabric and monomer occur to build the fabric chemically into the solid molecule. The monomer preferably contains other ingredients such as a polyester, such as the condensation product of a glycol, maleic anhydride and phthalic anhydride, or diallyl phthalate, etc. or polystyrene, etc., dissolved therein to interpolymerize or to interact in forming the solid polymer. When a solution in its monomeric polymerizable material of a resinous polymer such for example as polystyrene, polymethyl methacrylate, polymethyl acrylate, polyvinyl ester, polyamine, or other organic polymerization or condensation product is applied to the surface of the treated fabric and the solvent caused to polymerize insitu a more adherent coating may be had to the fabric and a direct chemical union between the fibrous material and the polymerizable or dissolved constituents is usually obtained.

Examples of the most commonly used free radical initiators or catalysts are benzoyl peroxide, cumene hydroperoxide, tertiary butyl hydroperoxide, and other organic peroxides and hydroperoxides. The peroxide, as is well-known, is usually used in relatively small amounts such as 1 to 2% of the weight of the polymerizable ingredient, such for example as the monomeric styrene present. Any of the various free radical initiators may be used when soluble or usable in one of the liquids of the method of polymerization used.

The temperature of polymerization is generally dependant on the size of the articles produced and the amount of catalyst present, it being necessary to remove the heat of polymerization. Higher temperatures increase polymerization speed, and cause greater exothermic reaction and may be used in thinner and smaller articles. The polymerization temperature is usually within the range of 50° F. to 200° F. and should be well below the boiling point of monomers present at the pressure used.

The following examples illustrate the present invention.

Example 1

A dry, glass fabric which has been previously freed from sizing and dried at 100° C. in a vacuum oven is submerged in a solution in 100 parts of dry toluene of five parts of a mixture of vinyl silicon chlorides having one to three vinyl groups attached directly to silicon and the remaining valences attached to chlorine. The fabric is allowed to stand in the solution for a few minutes, removed and drained free of liquid, and dried in a 75° C. vacuum oven to remove all traces of hydrochloric acid. The thus treated fabric is thereupon immersed into a styrene solution comprising 60 parts of styrene and 40 parts of a polyester prepared by condensing about 30 mol parts of maleic anhydride with 70 mol parts of adipic acid and 102 mol parts of ethylene glycol until a relatively viscous material is obtained, boiling at least 250° C. In effecting the condensation, the ingredients are heated slowly at first under an inert gaseous atmosphere, for example $N_2$, $CO_2$ etc., and the amount of heat applied is merely sufficient to cause vigorous boiling. As the reaction progresses, with elimination of water the temperature rises until a temperature of about 250° C. is obtained. The styrene solution of the polyester is mixed with one part of cumene hydroperoxide as a free radical initiating catalyst and is maintained at slightly elevated temperatures under an atmosphere of nitrogen and with oxygen excluded until a hard solid article is produced having the fabric insitu and intimately bonded through the now polymerized unsaturated linkages to the solid copolymer thus obtained.

Example 2

When several sheets of fabric are wetted as in Example 1 with the solution of unsaturated polyester in styrene and the wetted sheets plied up and pressed against each other and allowed to so remain until the polymerization progressed to the solid state, a laminated structure having exceptionally desirable properties is obtained.

Example 3

In place of the polyester-styrene solution of Example 1, a solution of polystyrene in styrene monomer and having about the same viscosity is substituted, other conditions being the same. An article having fabric bonded to the in situ polymerized polymer is also obtained.

Example 4

The styrene polyester solution of Example 1 is substituted by a viscous solution of polymethylmethacrylate in methacrylate monomer and the polymer, monomer, fiber mixture thus obtained is allowed to polymerize in shape form as in Example 1, except that the temperature was raised to about 80° C. and the catalyst was substituted by 1% based on the weight of the monomer present of benzoyl peroxide, other conditions being the same. A shaped article having fabric or fiber intimately bonded insitu is also obtained.

The vinyl silicon halides in the above examples may be substituted by any one or more of butadiene silicon halides, other materials capable of depositing vinylsiloxane units adherently on the surface of the reinforcing material, and vinyl silicon amines to also produce an integrally bonded composite article having excellent properties. Also as described and claimed in my related application Serial No. 251,152, filed October 12, 1951, vinyl isocyanates and other unsaturated isocyanates and isothiocyanates having a carbon-to-carbon double bond capable of entering into copolymerization may also be used in place of the unsaturated silicon halides to also obtain desirable properties in the fiber reinforced plastic or solid polymer article. The glass fabric may be substituted for matted glass fibers and other textile fabrics including cotton, rayon, and the like having oxygen containing hydroxyl groups (which of course are present in carboxyl groups) on surface portions thereof. The fabric or fibers in each instance being bonded to the insitu polymerized polymer by interaction of the unsaturated groups and the surface thereof with the monomer during the polymerization thereof. The solution containing the polymerizable monomer of the above examples may be substituted by other monomers or mixtures comprising monomers polymerizable as by homopolymerization, copolymerization, or interpolymerization to the solid state by free radical mechanism.

Example 5

100 grams of unbeaded carbon black are subjected to agitation in the presence of about one gram of a saturated vapor of a mixture of allyl dimethylsilicon chloride and methyl diallylsilicon chloride, the presence of saturated vapor being insured by a reducing of the pressure and elevating the temperature in the container. The agitation is continued in the presence of the organo-silicon halide vapor for about 10 minutes to allow thorough penetration of the vapor through the carbon black. The hydrochloric acid formed by the reaction is removed in any suitable manner, as for example vaporization at elevated temperature by neutralizing with an alkali material such as dry $NH_3$, by shaking the carbon black with water, or preferably by treating the carbon black with ether and water and washing the carbon black-ether mix until free from acid. The carbon black thus treated has much less tendency to be wet by water and much greater tendency to be wet by hydrocarbon organic solvents and contains allyl groups attached thereto for interpolymerization with free radical polymerizable materials, such as diallyl phthalate and the like.

The pigments in the above example may be substituted by other finely divided pigments including silica, aluminum oxide, titanium oxide, and the like, as well as fibers. The silicon halide may be substituted by the other unsaturated organosilicon compounds such as the vinylhalosilanes including vinyl trichlorsilane, bivinyl chlorsilane, divinyl dichlorsilane, and trivinyl monochlorsilane and mixtures of the same to obtain vinylsiloxane groups (vinyl siloxane portions of hydrolysis products of a vinyl chlorsilane) of the formula

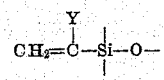

(where Y is hydrogen or halogen and the free silicon bonds are attached to carbon and/or oxygen atoms) on the surface of the silica, carbon black, fiber, and the like, which may be more readily interpolymerized with the highly activated polymerizable monomers such as styrenes (including styrene, vinyl toluene, etc.), methyl methacrylate, butadiene, and the like, which monomers are characterized by having a double bond in conjugated relation with the polymerizable olefinic double bond for resonant activation thereof.

Example 6

5 parts of carbon black treated as in Example 1 are dispersed into 100 parts by weight of styrene containing about ½ part of benzoyl peroxide and ½ part of soya lecithin by passing the mixture through a colloid mill. The dispersion thus prepared is then strongly agitated into a mass of water to maintain a suspension (fine droplets of styrene throughout the aqueous phase). The aqueous fluid is maintained in a completely filled vessel under superatmospheric pressure for several hours with said agitation until polymerization of the styrene in suspended form is had. The polystyrene thus produced has an unusual degree of jetness and it is desirable for use as a molding powder and in the preparation of plastic articles, or for solution in the preparation of a coating composition.

Example 7

The styrene in Example 6 is substituted by an equal amount of methyl methacrylate. The water of Example 6 is also substituted by an equal amount of a 1% aqueous solution of polymethacrylamide, other conditions remaining the same. The polymethyl methacrylate thus produced has exceptionally desirable properties.

Example 8

100 grams of finely divided silica treated as was the carbon black in Example 5 with saturated vapor of a mixture of mono-, di-, and trivinyl chlorsilanes to provide vinyl siloxane units on the surface of the silica are dispersed in a fluid comprising a solution of 10 parts of polystyrene in 90 parts of monomeric styrene and containing about one part of benzoyl peroxide. The mixture thus obtained is suspended as fine droplets in a mass (about 500 parts) of water containing about 1% of polymethacryl amide. The agitation is continued in a completely filled vehicle under superatmospheric pressure and with constant agitation at about 80° C. until the styrene is polymerized. The molding powder having polystyrene bonded to the silica through the residue from the interaction of the vinyl siloxane units and the styrene is obtained.

Example 9

The fluid in the above example containing monomeric styrene is substituted by an equal amount of a solution of polymethyl methacrylate in methyl methacrylate monomer other conditions remaining the same. A similar result is had.

When in the preceding examples, the aqueous solution is eliminated, a mass polymer is obtained upon polymerization of the polymerizable solvent (monomer) of the solution of resinous polymer in monomeric polymerizable material. The polymerization may or may not be in shaped form to form a shaped article directly as desired. The silica in the above example may be substituted by other pigments and fibers including glass fiber, rayon, cotton, and cellulose fibers having vinylsiloxane units attached to their surface as above noted.

Example 10

100 grams of matted glass fiber are contacted with 100 grams of a 10% solution in anhydrous benzene of vinylisocyanate at slightly elevated temperature. The treated fiber is then drained and allowed to dry. The fibers are maintained in contact with the isocyanate for approximately 15 minutes. These fibers are then wetted with a polymerizable polyester compound comprising one part of benzoyl peroxide, 200 parts of monomeric styrene, and 200 parts of a syrupy condensation product of 100.2 mol parts of ethylene glycol or diethylene glycol, 80 mol parts of phthalic acid anhydride, and 20 mol parts of maleic anhydride. The wetted fibers are molded and allowed to set up in the mold in the usual manner. The resulting compound is found to have increased water resistance and strength compared to compounds made from untreated glass fibers.

In this example, other textile fibers such as cotton and rayon fibers may be substituted for the glass fibers.

While the present invention is obviously especially applicable to the preparation of composite articles comprising a plurality of layers of fabric adhered together, it is also applicable to cast articles containing fibrous material therein as a reinforcing agent and to all fabrics having a coating formed by insitu polymerization of an unsaturated material. The free radical mechanism of polymerization is preferred, but the ionic, or acidic polymerization mechanisms such as utilized by the so-called alfin catalytic process of polymerization or the Friedel-Crafts process of polymerization wherein a Friedel-Crafts or alfin catalyst or even a sodium catalyst is used in place of the free radical producing alkyl peroxide is also applicable.

The monomeric materials used in the present invention are those containing polymerizable olefinic double bonds preferably in conjugation with a second olefinic double bond or other double bond which may resinate therewith. These monomeric materials include vinyl chloride, vinylidene chloride, vinylacetate, butadiene, isoprene, chloroprene, and other diolefinic compounds of less than 7 aliphatic carbon atoms, acrylonitrile and methacrylonitrile, methyl methacrylate, and other methacrylates and acrylates, arylvinyl compounds, and halogenated arylvinyl compounds such as the nuclearly chlorinated styrene, fluorinated styrenes, trifluoryl methyl styrenes, and the alphamethyl styrenes which are not substituted in the 2 and/or 6 position of the nucleus, or in the beta position of the side chain. Any one or more of the materials may be present in the polymerizable mixture.

The term "pigments" is used herein and in the appended claims in the generic sense as generally used by rubber compounders and the like to include powders, fillers and pulverulent inorganic solids generally regardless of whether they have as does carbon black and titanium dioxide, high coloring value, or have like silica and glass, no appreciable coloring value. Inasmuch as the hydrolysis products of an organohalosilane as is well known condense with hydroxyl on the surface of a solid or of other hydrolysis products to split out water which has no function, the terms "unsaturated siloxane portion of a hydrolysis product" and "vinyl siloxane portion of a hydrolysis product of a halosilane" are used in the appended claims to designate the active portion of the hydrolysis product, namely the previously mentioned group having general structural formula

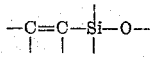

wherein the free silicon valences are connected to oxygen or carbon and the free carbon valences are connected to hydrogen, halogen or carbon. These terms do not include the portions of the hydrolysis product which are split off by condensation with other hydrolysis products or with hydroxyl on the surface of the solid to form water.

In my application Serial No. 439,463, filed June 25, 1954, I disclose and claim composite articles comprising textile fibers and/or inorganic pigments or powders with unsaturated organosiloxane groups bonded to their surfaces, which unsaturated organosiloxane groups are characterized by having olefinic groups spaced from the silicon by one carbon atom only.

It is to be understood that in accordance with the provisions of the patent statutes, variations and modifications of the specific examples herein described for purposes of illustration may be made without departing from the spirit of the invention.

What I claim is:

1. A member of the group consisting of fibers and inorganic pulverulent solids, which normally have hydroxyl groups on the surface thereof but which are modified by having unsaturated aliphatic siloxane groups, with a carbon of a carbon-to-carbon double bond directly attached to silicon, attached to surface portions thereof, whereby said group members are capable of forming a chemical bond by in situ interaction with a contacting olefinic polymerizable material, said surface portions containing said unsaturated siloxane groups being different from the interior of said group members and being an unsaturated siloxane portion of a product from hydrolysis of a halosilane having all valences of the silicon atom thereof connected to hydrocarbon and halogen groups, whereby after reaction with hydroxyl all valences of silicon are connected to a member of the group consisting of carbon and oxygen atoms, the unsaturated aliphatic groups of said unsaturated aliphatic siloxane groups being attached to said group member through silicon-oxygen linkages.

2. A product according to claim 1 wherein the unsaturated aliphatic groups are bivinyl groups.

3. An article of manufacture comprising a member of the group consisting of fibers and inorganic pulverulent solids and a solid in situ polymerized synthetic organic polymer of a liquid olefinic compound and an interfacial layer on said member of said group and in contact with said solid polymer, said layer comprising the residue from the interaction of vinyl siloxane groups on said group member with said groups in said polymerizable liquid which react with olefines, vinyl groups of said vinyl siloxane groups on said group member being attached directly to silicon, said surface layer on said group member prior to polymerization being vinyl siloxane groups and being different from the body of said group member and from said synthetic organic polymer, said group member prior to adhering vinyl siloxane groups thereto normally having hydroxyl groups on the surface thereof.

4. A method of forming an article comprising a member of the group consisting of inorganic pulverulent solids and fibers bonded together by a resinous polymer, which comprises wetting said group member with a polymerizable liquid comprising a monomeric polymerizable styrene and causing polymerization of said monomeric styrene in contact with said group member to form a solid while in contact with said group member, said group member normally having hydroxyl groups on the surface thereof but being characterized by having attached to surface portions thereof a coupling compound comprising a group of the formula

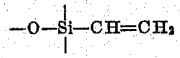

where the free valences of the silicon are attached to a member of the group consisting of oxygen and carbon atoms, said coupling compound, the body of said group member and the body of said resinous polymer being different.

5. A method of forming a composite article which comprises wetting an inorganic solid with olefinic polymerizable liquid capable of setting to the solid state and having groups which react with olefine groups, said inorganic solid having attached to the surface thereof vinyl siloxane portions of hydrolysis products of a vinyl halosilane having only vinyl and halogen groups attached to silicon.

6. An inorganic solid having attached to surface portions thereof a vinyl siloxane portion of hydrolysis products of a vinyl halosilane having only vinyl and halogen groups attached to the silicon atom thereof.

7. An article of manufacture comprising (1) a member of the group consisting of fibers and inorganic pulverulent solids, which normally have hydroxyl groups on the surface thereof but which are modified by having a surface layer of polymerizable unsaturated aliphatic groups which have a carbon of a carbon-to-carbon double bond attached directly to silicon, said groups being attached to the surface of said fibers through silicon-oxygen linkages, and (2) a contacting in situ polymerized solid polymer of a styrene, said solid polymer being bonded to said fibers by polymerization of said styrene with said unsaturated aliphatic groups, said surface layer being different from the body of said member of said group.

8. Reinforcing materials which are suitable for in situ polymerized high polymers of olefinic compounds, said reinforcing materials being selected from the group consisting of fibers and pigments, the surfaces of which normally have hydroxyl groups on the surface thereof but which are modified by having attached thereto vinyl siloxane units in which the vinyl groups are attached through siloxane groups, whereby interpolymerization of the vinyl siloxane and a resonantly-activated liquid polymerizable olefinic material may be had.

9. A method of forming an article comprising a member of the group consisting of fibers and inorganic pulverulent solids, which normally have hydroxyl groups on the surface thereof but which are bonded together by a resinous polymer, which comprises wetting said group member, surface portions of which are modified by a contacting interface comprising bivinyl groups attached to silicon, with a polymerizable liquid comprising monomeric styrene, and causing polymerization of said monomeric styrene in contact with said group member to form a solid while in contact with said group member, said interface and the body of said group member being different, said bivinyl groups being attached to said group member through silicon-oxygen linkages.

10. A method of forming an article comprising a member of the group consisting of fibers and inorganic pulverulent solids, which normally have hydroxyl groups on the surface thereof but which are bonded together by a resinous polymer, which comprises contacting surface portions of said group member with a vinyl chlorosilane to modify surface portions thereof and attach groups of the general formula

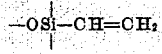

thereto, wetting the treated surface of said group member with a polymerizable liquid comprising a free radical catalyzed monomeric polymerizable liquid olefine having two sets of double bonds, and causing polymerization of said olefine in contact with said group member to procure a solid body.

11. A method of forming an article comprising a member of the group consisting of fibers and inorganic pigments, bonded together by a resinous polymer, said method comprising wetting said group member which normally carries hydroxyl groups on the surface thereof, but which has surface portions thereof modified by having vinyl groups attached thereto through silicon of a silicon-oxygen linkage, all valences of said silicon atoms being attached to a member of the group consisting of carbon and oxygen, at least one valence being connected to carbon and at least one valence of said silicon being directly connected to oxygen, with a liquid comprising a liquid polymerizable olefinic monomer of said polymer, and causing polymerization of said monomer to the solid state while in contact with said group member, said surface portions and the body of said group member being different.

12. An article of manufacture comprising an inorganic pigment, the particles of which normally carry hydroxyl groups on their surfaces but which have the surfaces modified by having attached thereto groups of the formula

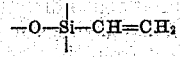

where the free silicon valences are attached to atoms selected from oxygen and carbon, said groups attached to said pigment being different from the body of said pigment, and said pigment particles being bonded together by an in situ polymerized solid polymer deposited from a liquid comprising a monomeric polymerizable olefinic compound, said solid polymer being in contact with the said groups on the surface of said particles.

13. The article according to claim 12 wherein the polymer is a polymer of a liquid comprising a monomeric styrene.

14. A material suitable for wetting by a polymerizable material and to be bonded thereto during subsequent in situ polymerization, said material being selected from the water-insoluble members of the group consisting of fibers and inorganic pigments, the surfaces of which normally carry hydroxyl groups on the surface thereof but which are modified by having attached thereto vinyl siloxane units, the vinyl groups being attached through the silicon-oxygen linkage, whereby interpolymerization of the vinyl siloxane and a liquid polymerizable olefinic material may be had, the amount of vinyl siloxane on said group member being small compared to the amount of said liquid polymerizable olefinic material required to fill the voids between said fibers and pigments, whereby said group member is capable of absorbing polymerizable liquid to join elements of said group member together, said vinyl siloxane groups on the surface of said group members being different from the body of said group members.

15. A method of forming a composite article which comprises wetting an inorganic solid with an olefinic polymerizable liquid capable of setting to the solid state, and allowing said liquid in contact with said solid to solidify, said inorganic solid normally having hydroxyl groups on the surface thereof but being modified by having attached to the surface thereof vinyl siloxane portions of hydrolysis products of a vinyl halosilane having only vinyl and halogen groups attached to silicon, the vinyl group being attached through a silicon-oxygen linkage.

16. An inorganic solid normally having hydroxyl groups on the surface thereof, but being modified by having attached to surface portions thereof a vinyl siloxane portion of hydrolysis products of a hydrolyzable vinyl silane having only vinyl and hydrolyzable groups attached to the silicon atom thereof, said solid being suitable for contact with a polymerizable material to be bonded thereto, said vinyl groups being held to said surface through a silicon-oxygen linkage.

17. A method of preparing composite articles which comprises bonding vinyl-silicon-oxide groups

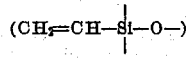

directly to the surface of textile fibres having hydroxyl groups on the surface by contacting said fibres with a hydroxyl-reactive vinyl silicon compound having a vinyl group attached directly to silicon, thereafter contacting the said fibres with a liquid polymerizable to the solid state and comprising a styrene and polymerizing said liquid to the solid state in contact with the surface of said fibres, whereby said vinyl groups are subject to interpolymerization with polymerizable constituents of said liquid to chemically bond the insitu formed solid polymer to the surface of said textile fibres through the silicon-oxide linkage of said vinyl silicon oxide groups.

18. A method of making fibre reinforced articles which comprises wetting, with a polymerizable olefinically-unsaturated liquid capable of being solidified to the rigid state by polymerization, textile fibres, which normally have hydroxyl groups on their surfaces but which are modified by having bonded to the surface thereof a vinyl siloxane coupling compound having a carbon of an olefinic group thereof attached directly to a silicon atom, said surface of said fibres having said coupling compound thereon being different from the body of said fibres and forming an interface for interpolymerization with unsaturated groups of an olefinically-unsaturated monomeric liquid polymerizable to the solid state by means of said olefinically-unsaturated groups, and maintaining said olefinically-unsaturated liquid in contact with said fibres until it has solidified to the solid nonflowable state, the vinyl group of said vinyl siloxane coupling compound being attached through a siloxane group to said fibres, whereby said olefinic groups on the surface of said fibres are available for interaction with the monomer when it is polymerized to the solid state.

19. A method of making fibre reinforced articles which comprises wetting, with a polymerizable olefinically-unsaturated liquid which is capable of solidification to the rigid state by additional polymerization at olefine groups thereof, textile fibres, which normally have hydroxyl groups on their surfaces but which are modified by having vinyl groups with a carbon atom of the carbon-to-carbon double bond thereof chemically bonded to the surfaces thereof directly through a silicon-oxygen linkage to form an interface which is different from the body of said fibres and which may be reacted with unsaturated groups of an olefinically-unsaturated liquid polymerizable to the solid state by means of polymerization of olefinically-unsaturated groups, and maintaining said olefinically-unsaturated liquid in contact with said fibres until it solidifies to the nonflowable state, whereby said fibres become bound to the resultant polymer through interaction of said olefinic groups on the surfaces of said fibres and said unsaturated liquid during the polymerization thereof to the solid state.

20. A method of making fibre reinforced articles which comprises wetting, with a polymerizable olefinically-unsaturated liquid which is capable of solidification to the rigid state by addition polymerization at olefine groups thereof, textile fibres, which normally have hydroxyl groups on their surfaces but which are modified by having chlorvinyl groups chemically bonded to the surfaces thereof through a silicon-oxygen linkage to form an interface which is different from the body of said fibres and which may be reacted with unsaturated groups of a polymerizable olefinically-unsaturated liquid solidifiable to the solid state by means of polymerization of said olefinically-unsaturated groups, and polymerizing said olefinically-unsaturated liquid in contact with said fibres to the solid state, a carbon atom of said chlorvinyl groups being directly attached to silicon of said silicon-oxygen linkage, whereby said fibres become bound to the resultant polymer through interaction of said chlorvinyl groups on the surfaces of said fibres and said olefinically-unsaturated liquid during the polymerization thereof to the solid state.

21. A method of preparing composite articles which comprises bonding vinyl-silicon-oxide groups

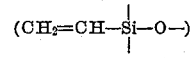

directly to the surface of textile fibres having hydroxyl groups on the surface thereof by contacting said fibres with a vinyl silicon halide and thereafter contacting the said fibres with a liquid polymerizable to the solid state and comprising a styrene and polymerizing polymerizable ingredients of said liquid sufficiently to solidify said liquid to a solid state while in contact with the surface of said fibres, whereby said vinyl groups on the surface of said fibres are subject to interpolymerization with polymerizable constituents of said liquid to chemically bond the in situ formed polymer to the surface of said textile fibres through the silicon-oxide linkage of said vinyl silicon oxide groups.

22. A method of preparing composite articles which comprises bonding vinyl-silicon-oxide groups

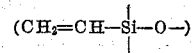

directly to the surface of textile fibres having hydroxyl groups on the surface thereof by contacting said fibres with a vinyl silicon trihalide and thereafter contacting the said fibres with a liquid polymerizable to the solid state and comprising a styrene and polymerizing polymerizable ingredients of said liquid in contact with surfaces of said fibres until said liquid solidifies, whereby said vinyl groups are subject to interpolymerization with polymerizable constituents of said liquid to chemically bond the in situ formed solid polymer to the surface of said textile fibres through the silicon-oxide linkage of said vinyl silicon oxide groups.

23. A method of preparing composite articles which comprises wetting textile fibres, which normally have hydroxyl groups on their surfaces but which have surfaces modified by having bonded directly thereto vinyl siloxane groups, with a liquid polymerizable to the solid state and comprising a styrene and maintaining contact of said liquid and surfaces of said fibres until polymerizable ingredients of said liquid have polymerized sufficiently to solidify said liquid to form a solid whereby said vinyl groups are subject to interpolymerization with polymerizable constituents of said liquid to chemically bond the in situ formed solid polymer to the surfaces of said textile fibres through the silicon-oxide linkage of said vinyl siloxane groups, said vinyl siloxane groups on said surface being different from the main body of said fibres and providing a coupling compound different from the mass of said solid polymer, the vinyl groups of said vinyl siloxane groups being attached to said surface through siloxane groups.

24. A composite article comprising an in situ polymerized solid polymer of a liquid comprising a polymerizable olefinic compound selected from the group consisting of diolefinic compounds having a chain of less than 7 aliphatic carbon atoms and polymerizable monoolefinic compounds, textile fibres in said polymer for reinforcing the same and an interfacial coupling compound bonded to said textile fibres and chemically combined with said solid polymer, said interfacial compound being different both from the body of said fibres and the mass of said solid polymer, said interfacial compound comprising the interpolymerization product from the interpolymerization of vinyl siloxane groups on the surfaces of said fibres and of said olefinic compound, said vinyl groups being attached directly to silicon and being bonded to said fibres through silicon-oxygen linkages.

25. A composite article comprising an in situ polymerized solid polymer of a liquid comprising a monomeric polymerizable styrene, textile fibres for reinforcing the same, and an interface comprising a coupling compound bonded to said textile fibres and in chemical combination with said solid polymer, said interface being different both from the mass of said solid polymer and from the body of said textile fibres and comprising an interpolymer of vinyl groups which are bonded to the surfaces of said fibres through siloxane groups and said styrene.

26. A composite article comprising an in situ polymerized solid polymer of a liquid comprising a polymerizable mono-olefinic compound, textile fibres in said polymer for reinforcing the same and an interfacial coupling compound bonded to said textile fibres and in chemical combination with said solid polymer, the interface of said polymer being different both from the body of said fibres and the mass of said solid polymer, said interfacial compound comprising an interpolymerization product of vinyl groups, which are bonded to the surfaces of said fibres through siloxane groups and said olefinic compound.

27. Textile fibres which normally have hydroxyl groups on the surface thereof modified by having chlorovinyl siloxane groups bonded to the surface thereof, the chlorovinyl groups of said chlorovinyl siloxane being attached to the surface of said fibres through siloxane groups.

28. A liquid-permeable mass of substantially dry flexible textile fibres suitable for soaking up a polymerizable liquid, said fibres being of a material which normally carries hydroxyl groups on the surface thereof, the surfaces of said fibres being modified by having groups of a vinyl siloxane attached thereto for subsequent reaction with said polymerizable liquid during the polymerization thereof, the said vinyl groups being attached through said siloxane groups to said surface, the fibres having said vinyl groups attached thereto being wettable by said polymerizable liquid, whereby said mass is capable of soaking up polymerization liquid to bond said fibres together upon the polymerization thereof and whereby a molecular bond between the surface of the fibres and the resultant polymer may be had by interaction of said vinyl groups and said polymerizable liquid during said polymerization.

References Cited in the file of this patent
UNITED STATES PATENTS

| | | |
|---|---|---|
| 2,436,304 | Johannson | Feb. 17, 1948 |
| 2,439,689 | Hyde | Apr. 13, 1948 |
| 2,465,731 | Kropa | Mar. 29, 1949 |
| 2,481,349 | Robie | Sept. 6, 1949 |
| 2,505,431 | Rust et al. | Apr. 25, 1950 |
| 2,595,728 | Swiss et al. | May 6, 1952 |

OTHER REFERENCES

"Fundamental Principles of Polymerization," by D'Alelio, published 1952 by Wiley & Sons, page 426.